Feb. 3, 1970  E. C. KIMBALL  3,493,029
TIRE CHANGING APPARATUS
Filed Oct. 10, 1967

INVENTOR.
EUGENE C. KIMBALL
BY
*Elliott & Pastoriza*
ATTORNEYS

United States Patent Office 3,493,029
Patented Feb. 3, 1970

3,493,029
TIRE CHANGING APPARATUS
Eugene C. Kimball, Ventura, Calif., assignor to Kimball Toppers Inc., a corporation of California
Filed Oct. 10, 1967, Ser. No. 674,299
Int. Cl. B60c 25/06
U.S. Cl. 157—1.2                                    1 Claim

ABSTRACT OF THE DISCLOSURE

This disclosure relates to a tire changing apparatus for heavy tires such as used on tractors. A frame is provided to engage the tire in cooperation with a double acting hydraulic piston attached to the rim for urging the rim through the tire to remove the tire or, in a reverse sense, urge the rim into the tire to mount the tire.

---

Figure 1:
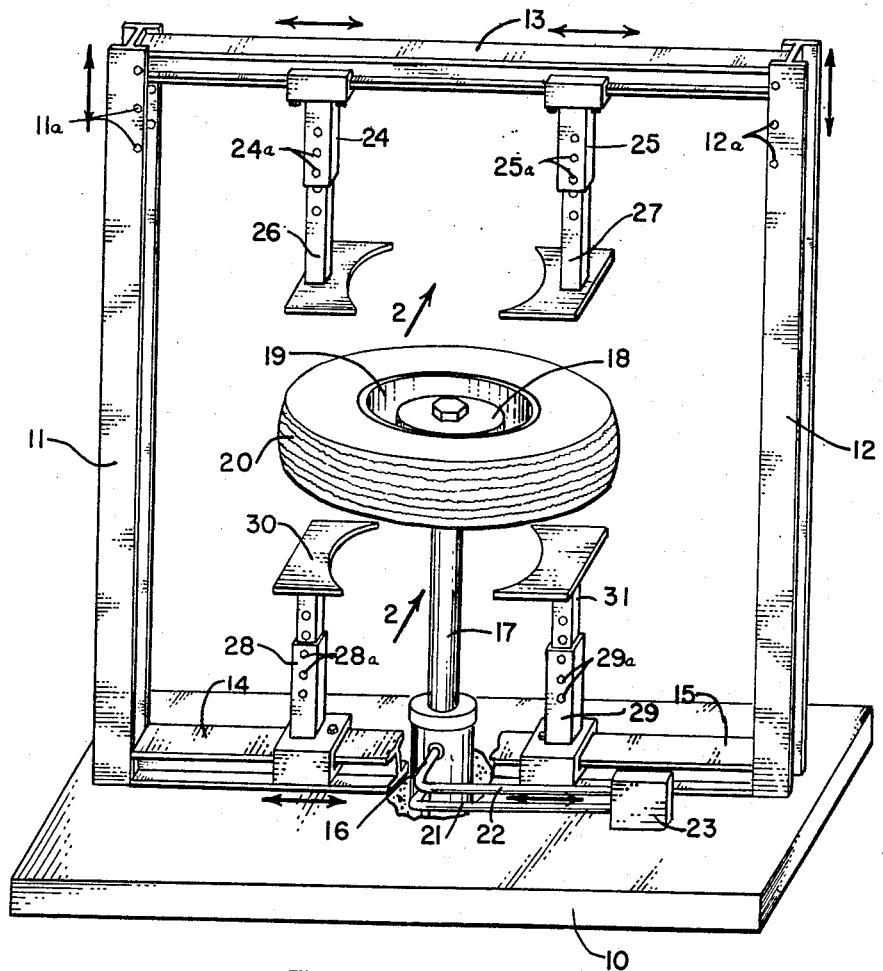

This invention relates to tire changing apparatus and more particularly to a power means for facilitating the changing of large, heavy duty type tires such as employed on trucks and tractors.

In changing or replacing a tire, the conventional operation entails removing the tire from the vehicle and thence employing an iron or "jimmie" for separating the tire from the rim. This operation is quite time consuming since it is necessary for the worker to wedge the tire free of the rim over the 360° of the rim. This loosening of the tire must then be repeated on the opposite side for the opposite rim portion. Even after the tire is loosened, it is a rather awkward procedure to physically remove the entire tire from the rim and in many instances, the tire itself can become damaged. The same difficulties are involved in replacing the tire on the rim.

The foregoing problems are particularly aggravated in the case of large, heavy duty type tires such as employed on tractors and trucks. Not only are these tires difficult to handle because of their bulk and weight but the tire removing and replacing operation from the rim structure is extremely time consuming and usually requires at least two if not more men.

With the foregoing considerations in mind, it is a primary object of the present invention to provide a tire changing apparatus which will greatly facilitate the loosening of a tire from its rim, removal of the tire, and replacement of the tire all to the end that tire changing operations particularly for heavy duty type tires can be carried out more easily and in less time than has been required heretofore.

More particularly, it is an object to provide a tire changing apparatus which is power actuated and so designed that a tire may be removed from a rim and replaced without the necessity of turning the tire over.

Other objects of this invention are to provide a tire changing apparatus for heavy duty tires which may be completely operated by one man with a consequence savings in labor, time and costs.

Briefly, these and other objects and advantages of this invention are attained by providing a basic frame means designed to engage a tire adjacent to the outer edge of the tire rim. A power means, preferably in the form of an hydraulic piston and cylinder, in turn serves to mount the rim portion of the tire and to effect movement under power relative to the frame means. This movement is directed along the axis of the tire and because of restraining of the tire by the engaging structure of the frame means, the rim may readily be simply pushed through the tire or into a new tire.

In the preferred embodiment, there are provided additional tire engaging means for engaging the opposite side of the tire and the hydraulic piston is double acting such that the tire may either be pushed against the first engaging means or pulled against the additional engaging means with the result that the tire may be initially loosened from the lock-ring without having to turn the tire over. The subsequent removal and replacement of the tire can then be accomplished by either pushing or pulling the rim by means of the hydraulic piston through the tire and subsequently into a new or repaired tire.

Figure 2:
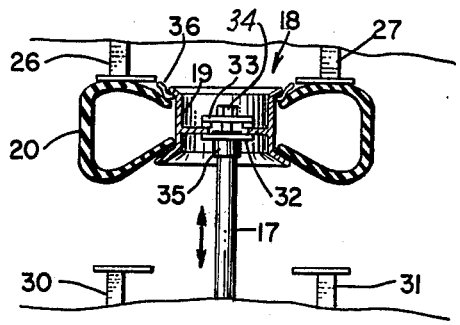

A better understanding of the invention will be had by now referring to a preferred embodiment as illustrated in the accompanying drawings, in which:

FIGURE 1 is a perspective view of the tire changing apparatus of this invention illustrating a tire mounted in the apparatus preparatory to being changed; and, FIGURE 2 is an enlarged, fragmentary cross section taken in the direction of the arrows 2—2 of FIGURE 1.

Referring first to FIGURE 1, the apparatus includes a base member 10 which preferably constitutes a concrete slab. First and second uprights 11 and 12 have their lower ends imbedded in this slab and extend vertically upwardly as shown. A cross member 13, which may be in the form of an I-beam, extends between the upright members 11 and 12 at a given level above the base 10. The actual horizontal level of this cross member 13 may be adjusted as by means of positioning holes 11a and 12a in the uprights 11 and 12 respectively. These holes are adapted to receive suitable pins (not shown) for passing through end openings (not shown) in the cross member 13 and thus securing these ends at a given level.

In the embodiment of FIGURE 1, the frame means also includes short lower I-beam structures 14 and 15 secured to the base 10 and extending in horizontal directions between the uprights.

Imbedded within the slab 10 is a power means in the form of an hydraulic cylinder 16 having a piston member 17 terminating at its upper end in an attachment means 18 for securing this end of the piston to the rim 19 of a tire 20. In the preferred embodiment, the hydraulic cylinder and piston structure is double acting and towards this end there are provided first and second hydraulic lines 21 and 22. These lines connect to opposite ends of the cylinder 16 and serve to conduct hydraulic fluid to one or the other of the ends by means of a suitable hydraulic control apparatus designated generally by the numeral 23. The piston member 17 may thus be positively driven in an upward or downward direction. In this respect, it should be noted that the axis of movement of the piston member 17 coincides with the axis A of the tire 20.

The apparatus is completed by tire engaging means in the form of carriage structures 24 and 25 coupled to the cross member 13 and including foot members 26 and 27 positioned to engage the tire 20 adjacent to the outer end of the rim 19. The downward extent of the foot members 26 and 27 may be adjusted relative to the carriage structures 24 and 25 as by employing a telescoping arrangement with suitable holes such as indicated at 24a and 25a. Pins (not shown) may be inserted in the holes to register with corresponding holes in the foot members 26 and 27 and thus enable adjustment of their level below the cross member 13.

Similarly, the lower cross members 14 and 15 support tire engaging means in the form of carriages 28 and 29 having upwardly extending foot members 30 and 31. Openings 28a and 29a permit adjustment of the level of the upper ends of these foot members in the same manner as for the foot members 26 and 27. This arrangement also permits the foot members to be completely removed and replaced by other tire engaging tools.

The upper and lower sets of carriages themselves are slidable along the respective cross I-beams all as indicated by the double headed arrows such that the distance beween the foot members 26 and 27 may be adjusted in accordance with the particular size of tire mounted on the end of the piston.

Referring now to FIGURE 2, the attachment means 8 for securing the tire rim to the end of the piston 17 will be described. As shown, the end of the piston 17 terminates in a flat plate 32 shown in full lines. This plate is arranged to engage the lower peripheral portion of the central opening of the rim 19. An upper plate 33 in turn sandwiches the rim with the lower plate 32 and a suitable bolt 34 is threaded down into the plate 32 to secure the plates together. Preferably a bearing mounting 35 is provided for the plate 32 so that the tire may be rotated about its axis. Any other suitable securing means may of course be employed. It is important however that the particular manner of securing or attaching the rim to the end of the piston 17 be such that the plane of the tire will be retained in a position normal to the axis of the piston.

In the enlarged view of FIGURE 2, the conventional lock ring is shown at 36 between the upper circumferential portion of the rim and the tire itself.

In operation, the horizontal positions of the carriages for the tire engaging structures are positioned on the cross member 13 and lower I-beam cross members 14 and 15 such that the upper and lower foot members 26, 27, and 30, 31 are separated by a horizontal distance to engage diametrically opposite portions of the tire close to the outer edge of the rim. Additionally, the physical positioning of the cross beam 13 itself as well as the telescoped positions of the foot members may be suitably adjusted depending upon the size of the tire such that there will be left some space between the engaging feet and the top and bottom surfaces of the tire when the tire is in an intermediate position as illustrated in FIGURE 1.

With the various adjustments effected and the elements locked in place by means of suitable pins in the openings as described, the upper end of the piston 17 is positioned by the hydraulic control 23 at an intermediate point between the engaging feet. The tire rim is then received over the end plate 32 of the piston 17. The plate 33 is then positioned and the bolt 34 threaded into the plate 32 to securely attach the tire rim to the end of the piston.

Thereafter, the hydraulic control 23 may be actuated to raise the piston 17 until the foot members 26 and 27 engage diametrically opposite upper portions of the tire 20. Upward movement of the piston 17 is initially carefully controlled such that the tire is merely loosened from the upper portion of the rim sufficient to enable removal of the lock ring 36 as shown in FIGURE 2. After the lock ring 36 has been removed, the hydraulic control is reversed in operation to positively lower the piston 17 and thus cause the foot engaging members 30 and 31 to engage the opposite or underside of the tire adjacent to the lower portion of the rim. Further downward movement of the piston 17 will result in the entire rim being pulled free of the tire, the tire itself being restrained by the feet 30 and 31.

As mentioned, the bearing 35 rotatably mounts the plate 32 on the end of the piston 17 such that the tire may be readily rotated in its own plane about its axis. This arrangement will facilitate the initial loosening of the tire from the rim by first applying a slight pressure at diametrically opposite points on the tire and then releasing this pressure and rotating the tire 90° and applying pressure at two other diametrically opposite points. In many instances however it is only necessary to apply the pressure at one set of diametrically opposite points.

Since the axis of movement of the piston coincides with the axis of the tire, the diametrically oppositely applied force on the tire by the foot engaging members is balanced and in a proper direction to enable easy removal with minimum risk of damage to the tire or rim.

To install a repaired or new tire, the foot members 26 and 27 are removed by removing the pins from the holes 24a and 25a and suitable installation members inserted in the carriages and positioned in the tire. Pressure is then applied to raise the rim and force the tire part way on the rim. The installation members are then removed and replaced with the foot members 26 and 27. The inner tube is inserted and partially inflated. Further pressure is then applied by the piston to urge the tire onto the rim a sufficient distance to enable the locking ring to be inserted. Hydraulic pressure is relieved to disengage the tire from the foot members and the tire then fully inflated. The rim with the tire mounted thereon is then removed from the piston end.

From the foregoing description, it will thus be evident that the present invention has provided a novel tire changing apparatus wherein all of the various objects set forth heretofore are fully realized.

What is claimed is:

1. Tire changing apparatus for removing a tire from a rim and replacing a tire on the rim comprising:
    (a) a frame means including a stationary base;
    (b) first and second spaced vertical uprights having their lower ends secured in the base;
    (c) an horizontal cross member extending between the uprights above the base;
    (d) height-adjustment means for adjusting the horizontal level of the cross member above the base;
    (e) a vertically aligned hydraulic cylinder imbedded in the base between the uprights and including a double acting piston movable in an up and down direction;
    (f) attachment means for attaching the piston upper end and a tire rim together so relative motion is prevented between the tire rim and piston in response to vertical forces exerted upwardly upon the tire, the attachment means being arranged to aid in mounting the tire in an horizontal plane beneath the cross member;
    (g) a pair of laterally spaced and vertically adjustable upper tire-engaging members coupled to the horizontal cross member;
    (h) upper adjustment means for varying the lateral spacing between the upper tire-engaging members to permit them to engage diametrically opposed outer edges of differently sized tires;
    (i) a pair of laterally spaced and vertically adjustable lower tire-engaging members coupled to the base;
    (j) lower adjustment means for varying the lateral spacing between the lower tire-engaging members to permit them to engage beneath the diametrically opposed outer edges of differently sized tires; and,
    (k) double-acting hydraulic control means structured to move the piston upwardly with the upper tire-engaging members positioned against the tire in order to push the rim at least partially through the tire, and thereafter move the piston downwardly with the second tire-engaging members positioned against the tire in order to pull the rim completely through the tire.

References Cited

UNITED STATES PATENTS

| | | | |
|---|---|---|---|
| 2,375,956 | 5/1945 | Smith et al. | 157—1.2 |
| 2,615,506 | 10/1952 | Wilson | 157—1.2 |
| 2,738,002 | 3/1956 | King | 157—1.2 |

GRANVILLE Y. CUSTER, JR., Primary Examiner